US012517535B2

(12) United States Patent
Lin et al.

(10) Patent No.: US 12,517,535 B2
(45) Date of Patent: Jan. 6, 2026

(54) LOW-DROPOUT REGULATOR CIRCUIT AND CONTROL METHOD THEREOF

(71) Applicant: Realtek Semiconductor Corporation, Hsinchu (TW)

(72) Inventors: Sheng-Wei Lin, Hsinchu (TW); Wei-Cheng Tang, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 249 days.

(21) Appl. No.: 18/315,506

(22) Filed: May 11, 2023

(65) Prior Publication Data

US 2023/0384813 A1 Nov. 30, 2023

(30) Foreign Application Priority Data

May 25, 2022 (TW) ................................. 111119505

(51) Int. Cl.
*G05F 1/575* (2006.01)
*G05F 1/46* (2006.01)
*G05F 3/30* (2006.01)

(52) U.S. Cl.
CPC .............. *G05F 1/575* (2013.01); *G05F 1/468* (2013.01); *G05F 3/30* (2013.01)

(58) Field of Classification Search
CPC ... G05F 1/10; G05F 1/46; G05F 1/461; G05F 1/56; G05F 1/563; G05F 1/569; G05F 1/573; G05F 1/575; G05F 1/59; G05F 1/595; G05F 1/613; G05F 3/26; G05F 3/30; H02M 1/0045; H02M 3/156; H02M 3/155
See application file for complete search history.

(56) References Cited

U.S. PATENT DOCUMENTS 8,536,845 B2 * 9/2013 Kim .......................... G05F 1/56 323/276
11,569,736 B2 * 1/2023 Kirchner ................. H02M 1/36
2010/0156364 A1 * 6/2010 Cho ........................ G05F 1/573 323/280
2010/0259235 A1 * 10/2010 Ozalevli ................... G05F 1/56 323/274
2012/0013317 A1 * 1/2012 Morino ................... G05F 1/565 323/280
2018/0314283 A1 * 11/2018 Feng ....................... G05F 1/563
2020/0287376 A1 * 9/2020 Yasusaka ............... H02H 7/205
2020/0333816 A1 10/2020 Zhang et al.
2023/0213955 A1 * 7/2023 Roh ........................ G05F 1/573 323/280

* cited by examiner

*Primary Examiner* — Thienvu V Tran
*Assistant Examiner* — Shahzeb K Ahmad
(74) *Attorney, Agent, or Firm* — CKC & Partners Co., LLC

(57) ABSTRACT

A low-dropout regulator circuit includes a reference circuit, an amplifying circuit, a power switch circuit, a feedback circuit, and a control circuit. The reference circuit is configured to generate a reference voltage. The amplifying circuit is configured to generate an amplifying voltage according to the reference voltage and a feedback voltage. The power switch circuit is configured to receive the amplifying voltage and generate an output voltage at an output terminal according to an input voltage. The feedback circuit is configured to generate the feedback voltage according to the output voltage. The control circuit is configured to control the power switch circuit according to the input voltage and a signal from the reference circuit.

12 Claims, 5 Drawing Sheets

LOW-DROPOUT REGULATOR CIRCUIT AND CONTROL METHOD THEREOF

RELATED APPLICATIONS

This application claims priority to Taiwanese Application Serial Number 111119505, filed May 25, 2022, which is herein incorporated by reference.

BACKGROUND

Technical Field

The present disclosure relates to a low-dropout regulator circuit and a control method thereof. More particularly, the present disclosure relates to a low-dropout regulator circuit and a control method thereof capable of avoiding a large inrush current flowing through a power switch circuit when the low-dropout regulator circuit is initially powered on.

Description of Related Art

With development of technology, various integrated circuits (ICs) are developed. However, performance of many integrated circuits can be further improved.

For example, in some related approaches, when a low-dropout regulator circuit is initially powered on (an input voltage initially increases), a large inrush current flows through a power switch circuit in the low-dropout regulator circuit. This large inrush current may burn components or wires in the circuit.

SUMMARY

Some aspects of the present disclosure are to provide a low-dropout regulator circuit. The low-dropout regulator circuit includes a reference circuit, an amplifying circuit, a power switch circuit, a feedback circuit, and a control circuit. The reference circuit is configured to generate a reference voltage. The amplifying circuit is configured to generate an amplifying voltage according to the reference voltage and a feedback voltage. The power switch circuit is configured to receive the amplifying voltage and generate an output voltage at an output terminal according to an input voltage. The feedback circuit is configured to generate the feedback voltage according to the output voltage. The control circuit is configured to control the power switch circuit according to the input voltage and a signal from the reference circuit.

Some aspects of the present disclosure are to provide a control method of a low-dropout regulator circuit. The control method includes following operations: generating, by a reference circuit, a reference voltage; generating, by an amplifying circuit, an amplifying voltage according to the reference voltage and a feedback voltage; receiving, by a power switch circuit, the amplifying voltage and generating, by the power switch circuit, an output voltage at an output terminal according to an input voltage; generating, by a feedback circuit, the feedback voltage according to the output voltage; and controlling, by a control circuit, the power switch circuit according to the input voltage and a signal from the reference circuit.

As described above, in the low-dropout regulator circuit of the present disclosure, the control circuit can control the power switch circuit according to the input voltage and the signal from the reference circuit. Thus, when the low-dropout regulator circuit is initially powered on, a smaller current flows through power switch circuit to avoid a large inrush current.

BRIEF DESCRIPTION OF THE DRAWINGS

The disclosure can be more fully understood by reading the following detailed description of the embodiment, with reference made to the accompanying drawings as follows.

DETAILED DESCRIPTION

In the present disclosure, "connected" or "coupled" may refer to "electrically connected" or "electrically coupled." "Connected" or "coupled" may also refer to operations or actions between two or more elements.

Figure 1:
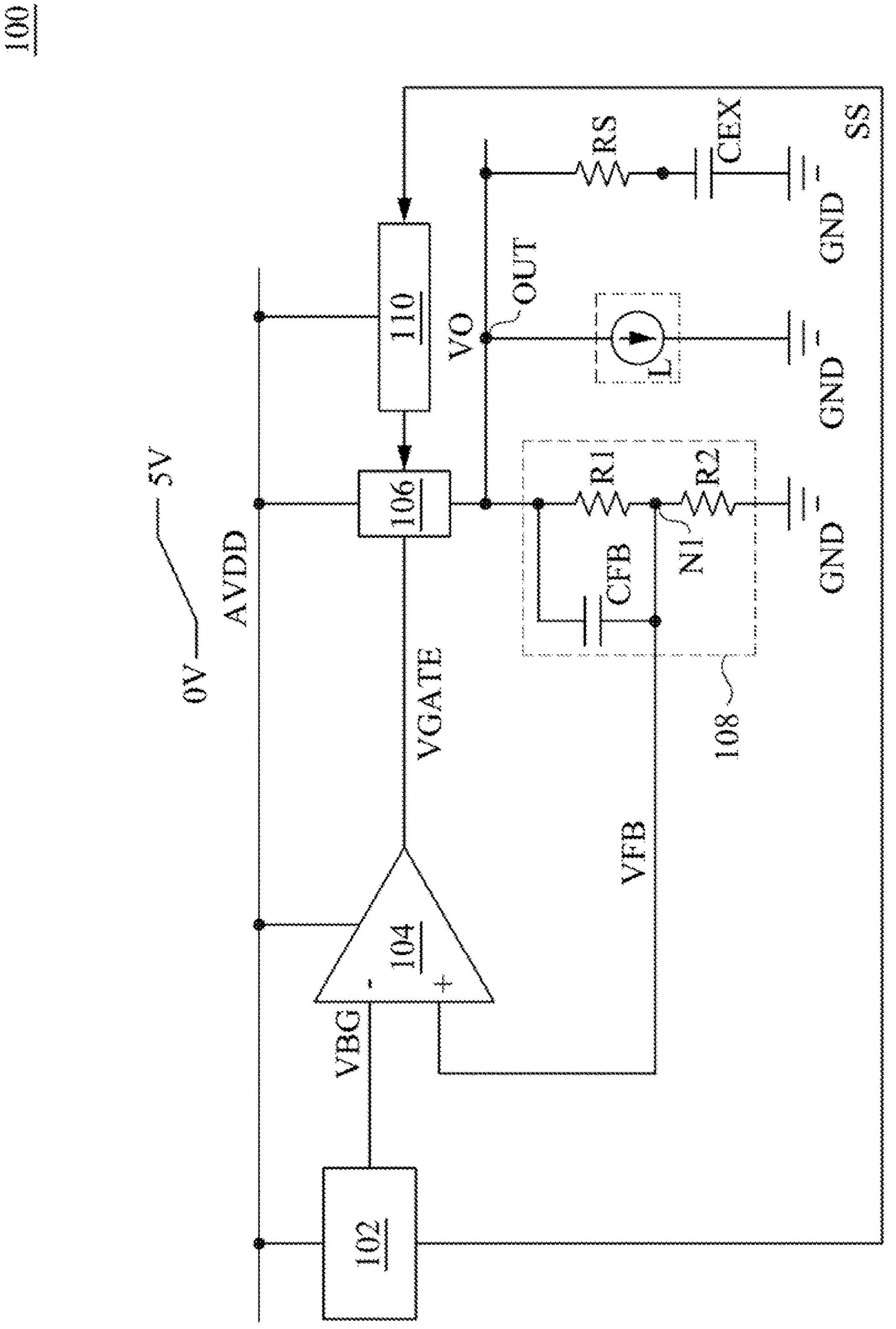
FIG. 1 is a schematic diagram of a low-dropout regulator circuit according to some embodiments of the present disclosure.

Reference is made to FIG. 1. FIG. 1 is a schematic diagram of a low-dropout regulator circuit 100 according to some embodiments of the present disclosure.

As illustrated in FIG. 1, the low-dropout regulator circuit 100 includes a reference circuit 102, an amplifying circuit 104, a power switch circuit 106, a feedback circuit 108, and a control circuit 110.

The reference circuit 102 is coupled to the amplifying circuit 104. The amplifying circuit 104 is coupled to the power switch circuit 106 and the feedback circuit 108. The power switch circuit 106 is coupled to the feedback circuit 108 and the control circuit 110. A load L is coupled between an output terminal OUT and a ground terminal GND. An external capacitor CEX can be disposed on a printed circuit board. A first terminal of the capacitor CEX is coupled to a pin of the output terminal OUT through other component or a metal wire with a parasitic resistor RS, and a second terminal of the capacitor CEX is coupled to the ground terminal GND. The external capacitor CEX is used to make the output voltage VO more stable.

The reference circuit 102 operates according to an input voltage AVDD, and the reference circuit 102 is used to generate a reference voltage VBG. In the embodiment of FIG. 1, the input voltage AVDD increase from 0 volt to 5 volts when the low-dropout regulator circuit 100 is powered on, but the present disclosure is not limited thereto. Other applicable voltages are within the contemplated scopes of the present disclosure.

The amplifying circuit 104 operates according to the input voltage AVDD and includes a positive terminal and a negative terminal. The negative terminal of the amplifying circuit 104 receives the reference voltage VBG from the reference circuit 102, and the positive terminal of the amplifying circuit 104 receives a feedback voltage VFB from the feedback circuit 108. The amplifying circuit 104 is used to compare the reference voltage VBG with the feedback voltage VFB to generate an amplifying voltage VGATE. In some embodiments, the amplifying circuit 104 can be an analog amplifier.

The power switch circuit 106 is used to receive the amplifying voltage VGATE, and generates an output voltage VO at the output terminal OUT according to the input voltage AVDD. The power switch circuit 106 can include at least one power switch, the amplifying voltage VGATE can turn on the power switch, and a current flowing the turned-on power switch can charge the output terminal OUT to generate the output voltage VO.

The feedback circuit 108 is used to generate the feedback voltage VFB to the positive terminal of the amplifying circuit 104 according to the output voltage VO. As illustrated in FIG. 1, the feedback circuit 108 includes a resistor R1, a resistor R2, and a capacitor CFB. The resistor R1 is coupled between the output terminal OUT and a feedback node N1. The resistor R2 is coupled between the feedback node N1 and the ground terminal GND. The capacitor CFB is coupled between the output terminal OUT and the feedback node N1. Based on a resistance-value ratio of the resistor R1 and the resistor R2, the feedback voltage VFB is generated at the feedback node N1 in response to the output voltage VO and is transmitted to the positive terminal of the amplifying circuit 104.

The control circuit 110 is used to control the power switch circuit 106 according to the input voltage AVDD and a signal SS from the reference circuit 102. The details about how the control circuit 110 controls the power switch circuit 106 according to the input voltage AVDD and the signal SS are described with reference to FIG. 2 to FIG. 4.

Figure 2:
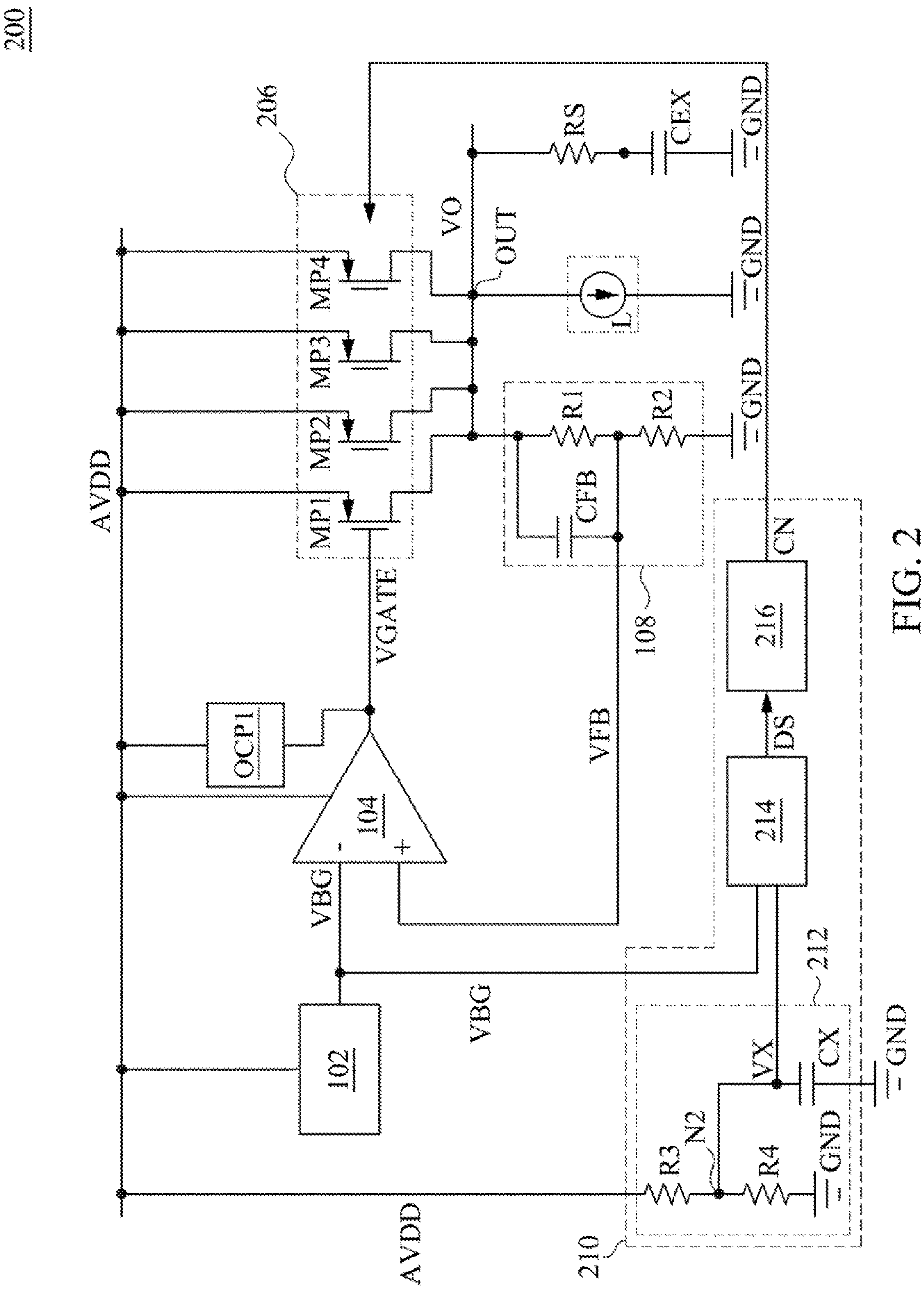
FIG. 2 is a circuit diagram of a low-dropout regulator circuit according to some embodiments of the present disclosure.

Reference is made to FIG. 2. FIG. 2 is a circuit diagram of a low-dropout regulator circuit 200 according to some embodiments of the present disclosure.

In the embodiment of FIG. 2, a control circuit 210 can be used to implement the control circuit 110 in FIG. 1. To be more specific, the control circuit 210 can control a power switch circuit 206 according to the input voltage AVDD and the reference voltage VBG from the reference circuit 102. In other words, in the embodiment of FIG. 2, the reference voltage VBG from the reference circuit 102 is used to implement the signal SS in FIG. 1.

As illustrated in FIG. 2, the control circuit 210 includes a voltage-divider circuit 212, a detector circuit 214, and a counter circuit 216.

The voltage-divider circuit 212 is used to generate a voltage-dividing voltage VX according to the input voltage AVDD. For example, the voltage-divider circuit 212 includes a resistor R3, a resistor R4, and a capacitor CX. A first terminal of the resistor R3 is used to receive the input voltage AVDD, a second terminal of the resistor R3 is coupled to a first terminal of the resistor R4, and a second terminal of the resistor R4 is coupled to the ground terminal GND. A first terminal of the capacitor CX is coupled between a connection node N2 between the resistor R3 and the resistor R4, a second terminal of the capacitor CX is coupled to the ground terminal GND, and the voltage-dividing voltage VX is generated at the connection node N2. With this configuration, there is a positive correlation between the voltage-dividing voltage VX and the input voltage AVDD. In other words, when the input voltage AVDD is higher, the voltage-dividing voltage VX will be higher.

The detector circuit 214 is used to generate a detection signal DS according to the reference voltage VBG and the voltage-dividing voltage VX. In some embodiments, the detector circuit 214 can be implemented by a comparator. For example, the comparator can compare the reference voltage VBG with the voltage-dividing voltage VX. When the voltage-dividing voltage VX is less than the reference voltage VBG, the comparator outputs the detection signal DS with a first logic value (e.g., a logic value 0). On the contrary, when the voltage-dividing voltage VX is equal to or greater than the reference voltage VBG, the comparator outputs the detection signal DS with a second logic value (e.g., a logic value 1). The detection signal DS with the second logic value (e.g., the logic value 1) can enable the counter circuit 216 to start counting.

The counter circuit 216 is used to generate a counting signal CN according to the detection signal DS. As described above, when the voltage-dividing voltage VX is equal to or greater than the reference voltage VBG, the detection signal DS with the second logic value (e.g., the logic value 1) can enable the counter circuit 216 to start counting to generate the counting signal CN so as to control the power switch circuit 206.

As illustrated in FIG. 2, the power switch circuit 206 includes power switches MP1-MP4. The power switches MP1-MP4 can be implemented by P-type transistors. The power switches MP1-MP4 are coupled to each other in parallel. First terminals of the power switches MP1-MP4 are used to receive the input voltage AVDD, and second terminals of the power switches MP1-MP4 are coupled to the output terminal OUT. A control terminal of the power switch MP1 is used to receive the amplifying voltage VGATE, and the counting signal CN is used to control the power switches MP2-MP4.

When the low-dropout regulator circuit 200 is initially powered on, the amplifying voltage VGATE can first turn on the power switch MP1 such that the input voltage AVDD can slightly charge the output terminal OUT. Since the input voltage AVDD is not large enough and the reference circuit 102 is not stable (the voltage-dividing voltage VX is less than the reference voltage VBG), the detector circuit 214 does not output the detection signal DS with the second logic value and the counter circuit 216 is still disabled. Thus, the power switches MP2-MP4 are turned off.

After a period of time, the input voltage AVDD is large enough (the voltage-dividing voltage VX is equal to or larger than the reference voltage VBG). In other words, the output voltage VO is charged to a higher voltage level and is more stable. Since the voltage-dividing voltage VX is equal to or greater than the reference voltage VBG, the detector circuit 214 can output the detection signal DS with the second logic value to enable the counter circuit 216 to start counting. For example, a value of the counting signal CN can increase from 0. In some embodiments, a power switch control circuit (not shown) can be coupled to the counter circuit 216. When the value of the counting signal CN increases to a first value (a first delay time elapses equivalently), the power switch control circuit can output a control signal to turn on the power switch MP2. When the value of the counting signal CN increases to a second value (a second delay time elapses equivalently), the power switch control circuit can output a control signal to turn on the power switch MP3. When the value of the counting signal CN increases to a third value (a third delay time elapses equivalently), the power switch control circuit can output a control signal to turn on the power switch MP4. In other words, when the input voltage AVDD is large enough (the output voltage VO is charged to a higher voltage level and is more stable), more power switches are turned on. Thus, the current flowing through the power switch circuit 206 becomes larger and the low-dropout regulator circuit 200 is capable of providing a larger current to the load L for normal operation. In some other embodiments, the power switches MP2-MP4 can be turned on simultaneously.

In some embodiments, the power switches MP1-MP4 have the same gate length but different gate widths. For example, the ratio of the gate widths of the power switches MP1-MP4 can be 1:2:4:8, but the present disclosure is not limited thereto. In the example above, the size of the power switch MP1 is smallest, and the current flowing through power switch circuit 206 during the initial stage (the low-dropout regulator circuit 200 is initially powered on) is very small. In some other embodiments, the power switches MP1-MP4 can have the same gate width.

In addition, the quantity of the transistors in the power switch circuit 206 is for illustration, and the present disclosure is not limited thereto. Other applicable quantities are within the contemplated scopes of the present disclosure.

As illustrated in FIG. 2, in some embodiments, the low-dropout regulator circuit 200 further comprises an over-current protection circuit OCP1. A first terminal of the overcurrent protection circuit OCP1 is used to couple receive the input voltage AVDD, a second terminal of the overcurrent protection circuit OCP1 is coupled to the control terminal of the power switch MP1. In general, when the low-dropout regulator circuit 200 is initially powered on, the control circuit 210 can control the current flowing through the power switch circuit 206. After the input voltage AVDD reaches a maximum input voltage (e.g., 5 volts), the over-current protection circuit OCP1 can operate normally to control the current flowing through the power switch circuit 206.

In some related approaches, a low-dropout regulator circuit merely includes an over-current protection circuit. However, as described above, the over-current protection circuit starts to operate normally after an input voltage reaches to a threshold voltage. If the over-current protection circuit have multiple cascaded transistors, the threshold voltage will be higher. Due to the threshold voltage, the over-current protection circuit may not start to operate normally when a power switch circuit in the low-dropout regulator circuit is initially turned on. Accordingly, the over-current protection circuit cannot avoid a large inrush current flowing the power switch circuit when the low-dropout regulator circuit is initially powered on (the input voltage initially increases).

In some other related approaches, an additional low-pass filter circuit (e.g., a resistor-capacitor circuit) is coupled to an output terminal of a reference circuit in a low-dropout regulator circuit. This additional low-pass filter circuit makes a reference voltage outputted from the reference circuit increase more slowly. Thus, the power switch circuit can slowly charge an output terminal until the output voltage becomes stable. However, the additional low-pass filter circuit occupies a larger circuit area.

Compared to the aforementioned related approaches, in the present disclosure, when the low-dropout regulator circuit 200 is initially powered on, the control circuit 210 can control the current flowing through power switch circuit 206 to be smaller. Thus, it can avoid a large inrush current flowing through the power switch circuit 206 when the low-dropout regulator circuit 200 is initially powered on. In addition, the present disclosure does not need to dispose the additional low-pass filter circuit, so the circuit area does not increase too much.

Figure 3:
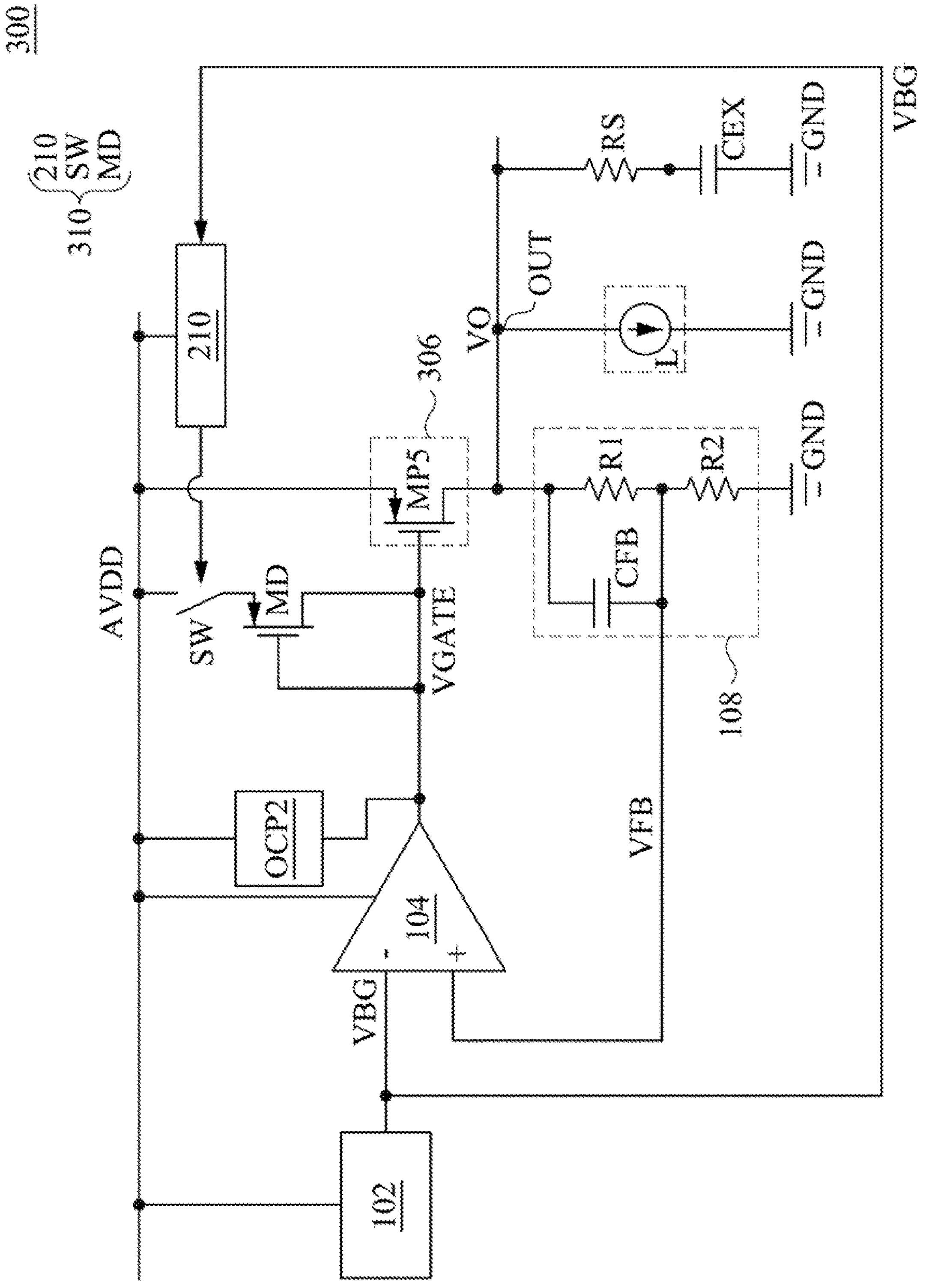
FIG. 3 is a circuit diagram of a low-dropout regulator circuit according to some embodiments of the present disclosure.

Reference is made to FIG. 3. FIG. 3 is a circuit diagram of a low-dropout regulator circuit 300 according to some embodiments of the present disclosure.

One of major differences between the low-dropout regulator circuit 300 in FIG. 3 and the low-dropout regulator circuit 200 in FIG. 2 is that a power switch circuit 306 includes a power switch MP5. The power switch MP5 can be implemented by a P-type transistor. The power switch MP5 includes a first terminal, a second terminal, and a control terminal. The first terminal of the power switch MP5 is used to receive the input voltage AVDD, the second terminal of the power switch MP5 is coupled to the output terminal OUT, and the control terminal of the power switch MP5 is coupled to an output terminal of the amplifying circuit 104.

One of major differences between the low-dropout regulator circuit 300 in FIG. 3 and the low-dropout regulator circuit 200 in FIG. 2 is that a control circuit 310 is used to implement the control circuit 110 in FIG. 1. The control circuit 310 includes the control circuit 210 in FIG. 2, an additional switch SW, and an additional transistor MD. The switch SW includes a first terminal and a second terminal. The transistor MD includes a first terminal, a second terminal, and a control terminal. The first terminal of the switch SW is used to receive the input voltage AVDD, and the second terminal of the switch SW is coupled to the first terminal of the transistor MD. The control terminal of the transistor MD is coupled to the second terminal of the transistor MD to form a diode connection. The second terminal of the transistor MD is coupled to the control terminal of the power switch MP5.

In some embodiments, the implementation of the control circuit 210 in FIG. 3 is similar to the control circuit 210 in FIG. 2. In FIG. 3, the counting signal CN outputted from the control circuit 210 is used to control the switch SW.

When the low-dropout regulator circuit 300 is initially powered on, the switch SW can be turned on to limit a gate-source voltage of the power switch MP5. Thus, the current flowing through the power switch circuit 306 is not too large.

Similar to FIG. 2, after a period of time, the input voltage AVDD is large enough (the voltage-dividing voltage VX is equal to or larger than the reference voltage VBG). In other words, the output voltage VO is charged to a higher voltage level and is more stable. The detector circuit 214 can output the detection signal DS with the second logic value to enable the counter circuit 216 to start counting. For example, a value of the counting signal CN can increase from 0. In some embodiments, a power switch control circuit (not shown) can be coupled to the counter circuit 216. When the value of the counting signal CN increases to a specific value (a delay time elapses equivalently), the power switch control circuit can output a control signal to turn off the switch SW. When the switch SW is turned off, the current flowing through the power switch circuit 306 becomes greater. Thus, the low-dropout regulator circuit 300 is capable of supplying a larger current to the load L for normal operation.

As illustrated in FIG. 3, in some embodiments, the low-dropout regulator circuit 300 further comprises an over-current protection circuit OCP2. A first terminal of the overcurrent protection circuit OCP2 is used to receive the input voltage AVDD, and a second terminal of the overcurrent protection circuit OCP2 is coupled to the control terminal of the power switch MP5. In general, when the low-dropout regulator circuit 300 is initially powered on, the control circuit 310 can control the current flowing through the power switch circuit 306. After the input voltage AVDD reaches a maximum input voltage (e.g., 5 volts), the overcurrent protection circuit OCP2 can operate normally to control the current flowing through the power switch circuit 306.

Similarly, when the low-dropout regulator circuit 300 is initially powered on, the current flowing through power switch circuit 306 is smaller. Thus, it can avoid a large inrush current flowing through the power switch circuit 306 when the low-dropout regulator circuit 300 is initially powered on. In addition, the present disclosure does not need to dispose additional low-pass filter circuit, so the circuit area does not increase too much.

Figure 4:
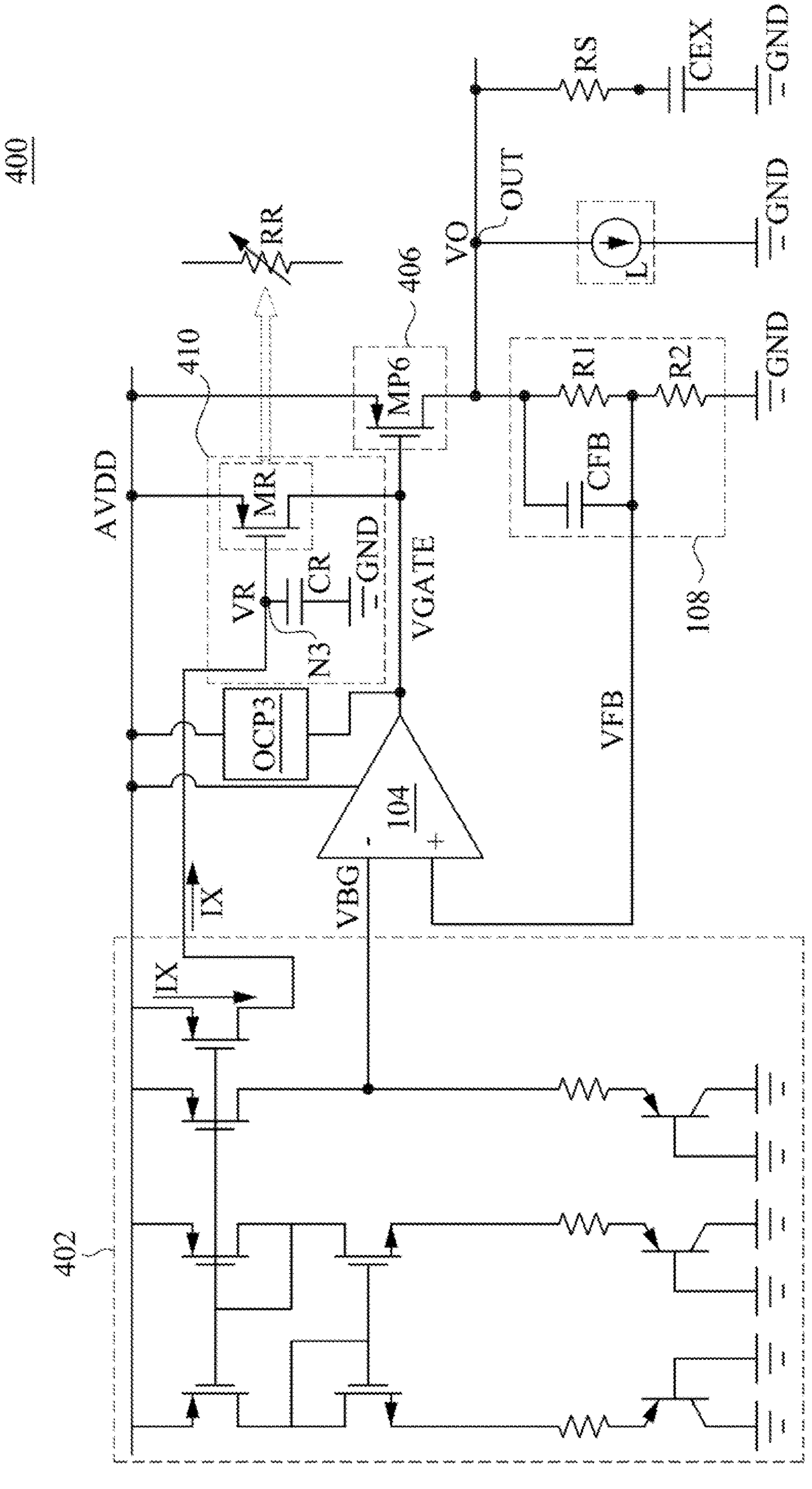
FIG. 4 is a circuit diagram of a low-dropout regulator circuit according to some embodiments of the present disclosure.

Reference is made to FIG. 4. FIG. 4 is a circuit diagram of a low-dropout regulator circuit 400 according to some embodiments of the present disclosure.

The following paragraphs mainly describe the major differences between the low-dropout regulator circuit 400 and the aforementioned embodiments. Other details of the low-dropout regulator circuit 400 that are similar to the aforementioned embodiments are not described herein again.

As illustrated in FIG. 4, a reference circuit 402 includes a current mirror. The current mirror in the reference circuit 402 can provide a reference current IX. In some embodiments, the reference circuit 402 can be used to implement the reference circuit 102 in FIG. 2 and FIG. 3.

In the embodiment of FIG. 4, a control circuit 410 is used to implement the control circuit 110 in FIG. 1. The control circuit 410 can control a power switch circuit 406 according to the input voltage AVDD and the reference current IX from the reference circuit 402. In other words, in the embodiment of FIG. 4, the reference current IX from the reference circuit 402 is used to implement the signal SS in FIG. 1.

The power switch circuit 406 includes a power switch MP6. The power switch MP6 can be implemented by a P-type transistor. The power switch MP6 includes a first terminal, a second terminal, and a control terminal. The first terminal of the power switch MP6 is used to receive the input voltage AVDD, the second terminal of the power switch MP6 is coupled to the output terminal OUT, and the control terminal of the power switch MP6 is coupled to the output terminal of the amplifying circuit 104.

The control circuit 410 includes a transistor MR and a capacitor CR. The transistor MR includes a first terminal, a second terminal, and a control terminal. The first terminal of the transistor MR is used to receive the input voltage AVDD. The second terminal of the transistor MR is coupled to the control terminal of the power switch MP6. The reference circuit 402, the control terminal of the transistor MR, and a first terminal of the capacitor CR are coupled to at a node N3. A second terminal of the capacitor CR is coupled to the ground terminal GND. A node voltage VR at the node N3 initially has a first logic value (e.g., a logic value 0), and the reference current IX from the reference circuit 402 can be used to charge at the node N3.

During the low-dropout regulator circuit 400 is initially powered on, the input voltage AVDD can increase from 0 volt to a threshold voltage of the transistor MR. Since the node voltage VR at the node N3 initially has the first logic value (e.g., the logic value 0), the transistor MR is turned on. The power switch MP6 is turned off. When the reference circuit 402 is stable, the reference circuit 402 generates the weak reference current IX to charge at the node N3 slowly. During the charging process, a gate-source voltage of the transistor MR gradually decreases. Accordingly, an equivalent resistance RR of the transistor MR gradually becomes larger. This makes the difference between the input voltage AVDD and the amplifying voltage VGATE larger, and then makes the turned-on degree of the power switch MP6 gradually increases. Accordingly, the input voltage AVDD charges the output terminal OUT. When the node voltage VR at the node N3 is charged to a high enough level (e.g., the difference between the input voltage AVDD and the node voltage VR is less than an absolute value of the threshold voltage of the transistor MR), the power switch MP6 can provide a larger current to the load L.

As illustrated in FIG. 4, in some embodiments, the low-dropout regulator circuit 400 further comprises an overcurrent protection circuit OCP3. A first terminal of the overcurrent protection circuit OCP3 is used to receive the input voltage AVDD, and a second terminal of the overcurrent protection circuit OCP3 is coupled to the control terminal of the power switch MP6. In general, when the low-dropout regulator circuit 400 is initially powered on, the control circuit 410 can control the current flowing through the power switch circuit 406. After the input voltage AVDD reaches a maximum input voltage (e.g., 5 volts), the overcurrent protection circuit OCP3 can operate normally to control the current flowing through the power switch circuit 406.

Similarly, when the low-dropout regulator circuit 400 is initially powered on, the current flowing through power switch circuit 406 is smaller. Thus, it can avoid a large inrush current flowing through the power switch circuit 406 when the low-dropout regulator circuit 400 is initially powered on. In addition, the present disclosure does not need to dispose additional low-pass filter circuit, so the circuit area does not increase too much.

Figure 5:
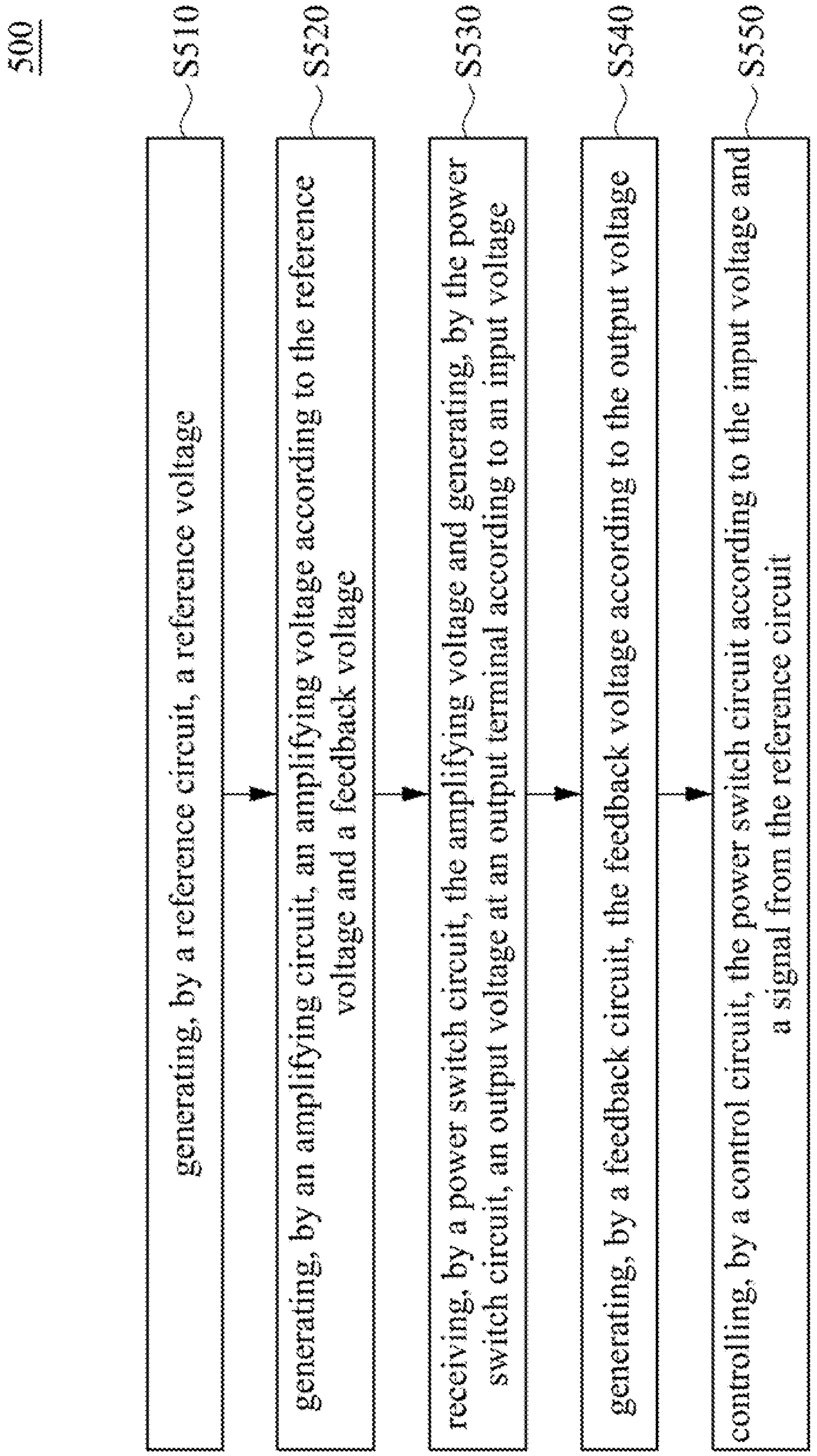
FIG. 5 is a flow diagram of a control method according to some embodiments of the present disclosure.

Reference is made to FIG. 5. FIG. 5 is a flow diagram of a control method 500 according to some embodiments of the present disclosure. As illustrated in FIG. 5, the control method 500 includes operation S510, operation S520, operation S530, operation S540, and operation S550.

In some embodiments, the control method 500 can be implemented to the low-dropout regulator circuit 100 in FIG. 1, but the present disclosure is not limited thereto. For better understanding, the control method 500 are described with reference to the low-dropout regulator circuit 100 in FIG. 1.

In operation S510, the reference circuit 102 generates the reference voltage VBG. In some embodiments, the reference circuit 102 can be implemented by a reference circuit 402 in FIG. 4.

In operation S520, the amplifying circuit 104 generates the amplifying voltage VGATE according to the reference voltage VBG and the feedback voltage VFB. In some embodiments, the negative terminal of the amplifying circuit 104 receives the reference voltage VBG, and the positive terminal of the amplifying circuit 104 receives the feedback voltage VFB.

In operation S530, the power switch circuit 106 receives the amplifying voltage VGATE and generates the output voltage VO at the output terminal OUT according to the input voltage AVDD. In some embodiments, when the power switch circuit 106 is turned on, the input voltage AVDD can charge the output terminal OUT through the power switch circuit 106.

In operation S540, the feedback circuit 108 generates the feedback voltage VFB according to the output voltage VO. In some embodiments, a relationship between the feedback voltage VFB and the output voltage VO is related to the resistance-value ratio of the resistor R1 and the resistor R2.

In operation S550, the control circuit 110 controls the power switch circuit 106 according to the input voltage AVDD and the signal SS from the reference circuit 102. In some embodiments (e.g., FIG. 2 and FIG. 3), the signal SS is the reference voltage VBG from the reference circuit 102. In some embodiments (e.g., FIG. 4), the signal SS is the reference current IX from the reference circuit 102.

As described above, in the low-dropout regulator circuit of the present disclosure, the control circuit can control the power switch circuit according to the input voltage and the signal from the reference circuit. Thus, when the low-dropout regulator circuit is initially powered on, a smaller current flows through power switch circuit to avoid a large inrush current.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A low-dropout regulator circuit, comprising:

a reference circuit configured to generate a reference voltage;

an amplifying circuit configured to generate an amplifying voltage according to the reference voltage and a feedback voltage;

a power switch circuit configured to receive an input voltage and the amplifying voltage and generate an output voltage at an output terminal according to the input voltage;

a feedback circuit configured to generate the feedback voltage according to the output voltage; and a control circuit configured to control the power switch circuit according to the input voltage and a signal from the reference circuit, wherein the control circuit comprises:

a voltage-divider circuit configured to divide the input voltage to generate a voltage-dividing voltage;

a detector circuit configured to compare the voltage-dividing voltage with the reference voltage to generate a detection signal; and a counter circuit configured to generate a counting signal according to the detection signal, wherein the counting signal is configured to control the power switch circuit.

2. The low-dropout regulator circuit of claim 1, wherein the signal from the reference circuit is the reference voltage.

3. The low-dropout regulator circuit of claim 1, wherein the power switch circuit comprises a first power switch and a plurality of second power switches, a control terminal of the first power switch is configured to receive the amplifying voltage, and the counting signal is configured to control the plurality of second power switches.

4. The low-dropout regulator circuit of claim 3, further comprising:

an overcurrent protection circuit comprising a first terminal and a second terminal, wherein the first terminal of the overcurrent protection circuit is configured to receive the input voltage, and the second terminal of the overcurrent protection circuit is coupled to the control terminal of the first power switch.

5. The low-dropout regulator circuit of claim 1, wherein the power switch circuit comprises a power switch, and the control circuit comprises:

a switch comprising a first terminal and a second terminal, wherein the first terminal of the switch is configured to receive the input voltage, wherein the counting signal is configured to control the switch; and a transistor comprising a first terminal, a second terminal, and a control terminal, wherein the first terminal of the transistor is coupled to the second terminal of the switch, the control terminal of the transistor is coupled to the second terminal of the transistor, and the second terminal of the transistor is coupled to a control terminal of the power switch.

6. The low-dropout regulator circuit of claim 5, further comprising:

an overcurrent protection circuit comprising a first terminal and a second terminal, wherein the first terminal of the overcurrent protection circuit is configured to receive the input voltage, and the second terminal of the overcurrent protection circuit is coupled to the control terminal of the power switch.

7. A control method of a low-dropout regulator circuit, comprising:

generating, by a reference circuit, a reference voltage;

generating, by an amplifying circuit, an amplifying voltage according to the reference voltage and a feedback voltage;

receiving, by a power switch circuit, an input voltage and the amplifying voltage and generating, by the power switch circuit, an output voltage at an output terminal according to the input voltage;

generating, by a feedback circuit, the feedback voltage according to the output voltage; and controlling, by a control circuit, the power switch circuit according to the input voltage and a signal from the reference circuit, wherein controlling, by the control circuit, the power switch circuit according to the input voltage and the signal comprises:

dividing, by a voltage-divider circuit in the control circuit, the input voltage to generate a voltage-dividing voltage;

comparing, by a detector circuit, the voltage-dividing voltage with the reference voltage to generate a detection signal; and generating, by a counter circuit in the control circuit, a counting signal according to the detection signal to control the power switch circuit.

8. The control method of claim 7, wherein the signal from the reference circuit is the reference voltage.

9. The control method of claim 7, wherein the power switch circuit comprises a first power switch and a plurality of second power switches, a control terminal of the first power switch is configured to receive the amplifying voltage, and the counting signal is configured to control the plurality of second power switches.

10. The control method of claim 9, wherein the low-dropout regulator circuit further comprises:

an overcurrent protection circuit comprising a first terminal and a second terminal, wherein the first terminal of the overcurrent protection circuit is configured to receive the input voltage, and the second terminal of the overcurrent protection circuit is coupled to the control terminal of the first power switch.

11. The control method of claim 7, wherein the power switch circuit comprises a power switch, and the control circuit further comprises:

a switch comprising a first terminal and a second terminal, wherein the first terminal of the switch is configured to receive the input voltage, wherein the counting signal is configured to control the switch; and a transistor comprising a first terminal, a second terminal, and a control terminal, wherein the first terminal of the transistor is coupled to the second terminal of the switch, the control terminal of the transistor is coupled to the second terminal of the transistor, and the second terminal of the transistor is coupled to a control terminal of the power switch.

12. The control method of claim 11, wherein the low-dropout regulator circuit further comprises:

an overcurrent protection circuit comprising a first terminal and a second terminal, wherein the first terminal of the overcurrent protection circuit is configured to receive the input voltage, and the second terminal of the overcurrent protection circuit is coupled to the control terminal of the power switch.

* * * * *